Jan. 2, 1962   F. L. PARHAM   3,015,293
SEAMER AND METHOD
Filed June 14, 1957   10 Sheets-Sheet 1

INVENTOR.
FLETCHER L. PARHAM
BY
ATTY.

Jan. 2, 1962 F. L. PARHAM 3,015,293
SEAMER AND METHOD
Filed June 14, 1957 10 Sheets-Sheet 2

INVENTOR.
FLETCHER L. PARHAM
BY *Gordon C. Mack*
ATTY.

Jan. 2, 1962 F. L. PARHAM 3,015,293
SEAMER AND METHOD

Filed June 14, 1957 10 Sheets-Sheet 3

INVENTOR.
FLETCHER L. PARHAM
BY
ATTY.

*INVENTOR.*
FLETCHER L. PARHAM

ATTORNEY

Jan. 2, 1962     F. L. PARHAM     3,015,293

SEAMER AND METHOD

Filed June 14, 1957     10 Sheets-Sheet 8

INVENTOR.
FLETCHER L. PARHAM
BY
ATTORNEY

Jan. 2, 1962 F. L. PARHAM 3,015,293
SEAMER AND METHOD
Filed June 14, 1957 10 Sheets-Sheet 9

INVENTOR.
FLETCHER L. PARHAM

ATTORNEY

Jan. 2, 1962 F. L. PARHAM 3,015,293
SEAMER AND METHOD
Filed June 14, 1957 10 Sheets-Sheet 10

INVENTOR.
FLETCHER L. PARHAM
BY
ATTORNEY

United States Patent Office 3,015,293
Patented Jan. 2, 1962

3,015,293
SEAMER AND METHOD
Fletcher L. Parham, 1225 Lexington Ave., Akron, Ohio
Filed June 14, 1957, Ser. No. 666,281
15 Claims. (Cl. 113—54)

This invention relates to closing or completing a seam of a so-called Pittsburgh lock. It includes both the method and the seaming mechanism.

The Pittsburgh lock is used widely in the sheet-metal industry in fastening opposite edges of one sheet of metal together, or two edges of different sheets of metal together, at a corner of a pipe or other structure. Both edges are pre-fabricated in a particular manner. One of the sheets (or one edge of a single sheet) is folded back on itself, near its edge, to form a flat S-fold. This is referred to herein as the replaited sheet, and the edge beyond the fold is called the outstanding edge. The other sheet (or the opposite edge of the single sheet) is formed with a right-angle bend near its edge. This is referred to herein as the angled sheet. The edge near the bend may be straight or curved. In forming the Pittsburgh lock, the bent edge of the angled sheet is inserted in the inside fold of the replaited sheet, and then the outstanding edge of the replaited sheet is folded flat against the portion of the angled sheet just inside the bend. This completes or closes the lock, and holds the two sheets together.

Although the lock will be described herein more particularly in connection with the interlocking of the edges of separate sheets of metal, it is to be understood that the mechanism described can be used equally well in interlocking opposite edges of a single sheet.

Prior to this invention, the Pittsburgh lock has been completed manually by hammering the seam closed, or by the use of large permanent equipment designed for the purpose. A preferred form of the seamer of this invention is a portable machine, which propels itself from one end of the lock to the other as it completes the lock. However, the seamer of this invention may be built in different sizes, and may be portable or stationary.

The invention includes rotatable gripping means, adjustably spaced, and interlocking means for holding the preformed sheet-metal members in the proper relation for completion of the seam. The spacing of the gripping members is adjustable to accommodate metal sheets of different gauges. The forming means may be a cam or may include one or more rollers. It includes a surface slanted to the horizontal which folds the outstanding edge of the replaited sheet against the angled sheet, completing the lock.

The gripping means includes one or two pairs of rollers. If there are two pairs, the first pair is referred to as the positioning rollers. These make the first contact with the sheets of metal. The second pair of rollers may constitute or cooperate with the forming means which closes the lock, and in that event they will be referred to as folding rollers. There are also one or more grooved guide rollers which constitute the interlocking means. They position the replaited sheet and hold the bent edge of the angled sheet in its inside fold.

The forming means may be a stationary member or a rotating cam member. The cam edge which completes the lock by folding the outstanding edge of the replaited sheet against the angled sheet, may be relatively straight or curved. It is inclined generally upwardly at an angle of about 30 to 45 degrees to the horizontal. (The terms "up" and "down" are used herein to refer to directions when the sheets of metal are in the relation shown in FIG. 1.)

The invention will be further explained in connection with the accompanying drawings which illustrate the seamer and its use. The drawings do not show the details of any drive means, etc. The seamer is preferably driven by a small electric motor which may be located in any convenient position on or in the seamer.

This application is a continuation-in-part of my application Serial No. 616,668 filed October 18, 1956, now abandoned.

Figure 20:
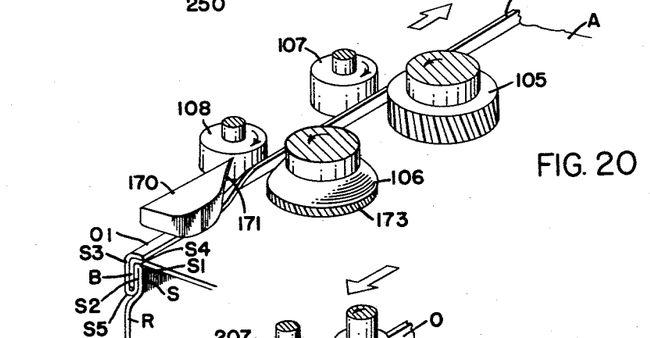
FIG. 20 is a view in perspective which illustrates the operation of the type of equipment shown in FIGS. 11–19.
Figure 21:
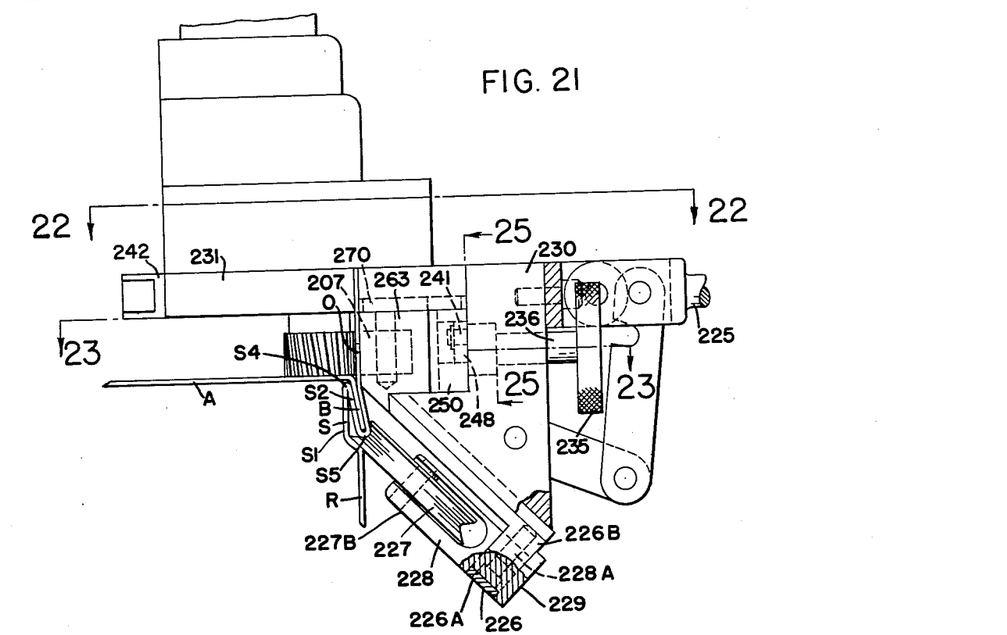
FIG. 21 is a view similar to FIG. 11, but showing the bottom of the third type of equipment.
Figure 22:
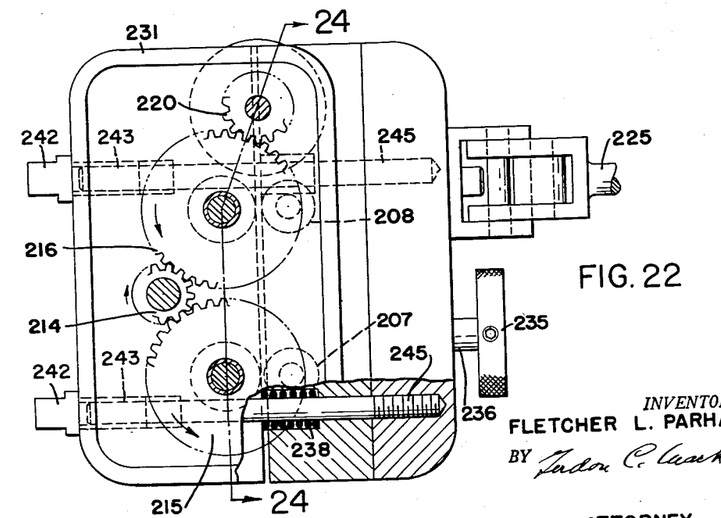
FIG. 22 is a horizontal section on line 22—22 of FIG. 21.
Figure 25:
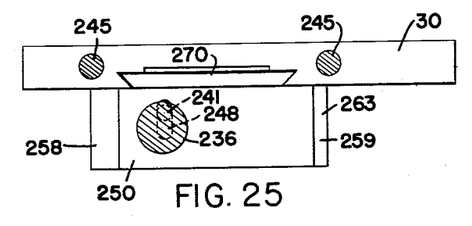
FIG. 25 is a vertical view on the line 25—25 of FIG. 21.
Figure 26:
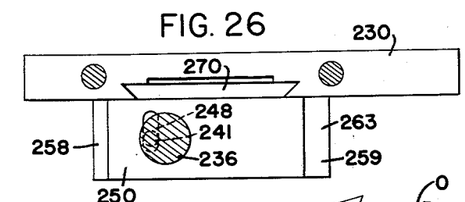
FIG. 26 is a similar view, but with the cam in an open position.
Figure 27:
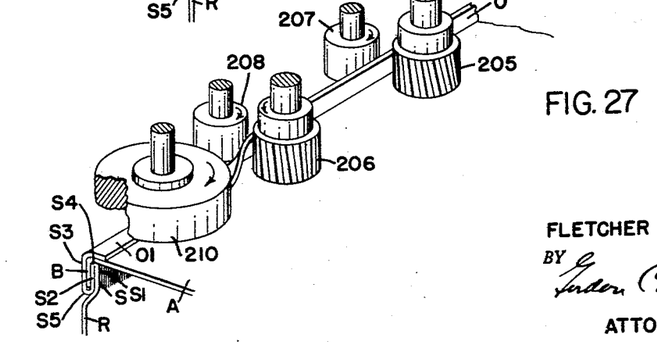
FIG. 27 is a view in perspective which illustrates the operation of equipment of the type illustrated in FIGS. 21–26.

The drawings illustrate three different types of seamer. One type is shown in FIGS. 4–9, and FIG. 10 illustrates how a lock is completed in this device. FIGURES 11–19 illustrate a second type of seamer, and FIG. 20 illustrates how a lock is completed in this type. FIGURES 21–26 illustrate the third type of seamer, and FIG. 27 illustrates how a lock is completed in this type.

In the drawings:

FIG. 23 is a horizontal section on line 23—23 of FIG. 21;

FIG. 23-A illustrates diagrammatically how the interlocking rollers can operate on a radius;

FIG. 24 is a vertical section on line 24—24 of FIG. 22;

Figure 1:
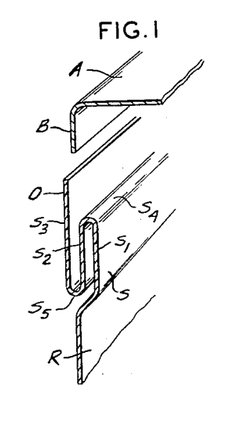
FIGS. 1, 2 and 3 illustrate sectional views through edges of two sheets of metal in the relation they bear to one another in the process of assembling and seaming a Pittsburgh lock.
Figure 2:
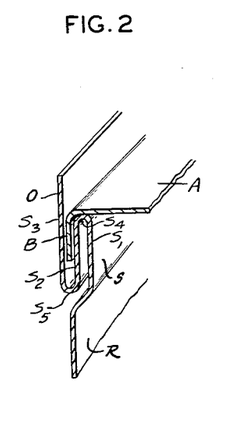
Figure 3:
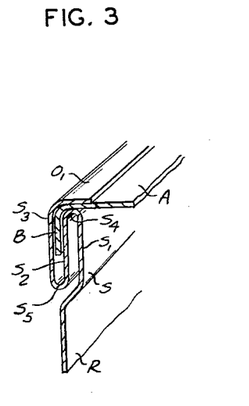

The details and closing of a Pittsburgh lock are illustrated in FIGS. 1–3. FIGURE 1 shows the two edges which are to be locked together. They may be opposite edges of the same sheet or edges of two different sheets. The angled sheet A is bent at a right angle to form the bent or angled portion B which fits into the other or replaited sheet R.

The S-fold S of the replaited sheet comprises the inner ply S1, the intermediate ply S2, and the outer ply S3. The outstanding edge O, which is an extension of this outer ply, is folded over to the position O1, in the seamer of this invention to close or complete the lock as illustrated in FIG. 3.

Connecting the inner ply S1 and intermediate ply S2 is the inner bend S4. Connecting the intermediate ply S2 and the outer ply S3 is the outer bend S5.

In making the lock, the bent portion B of the angled sheet A is placed in the inside fold formed by the intermediate ply S2 and the outer ply S3 of the replaited sheet R, as illustrated in FIG. 2. Then the outstanding edge O is bent into place as shown in FIG. 3 to complete the lock. When bent into place, this edge is designated as O1.

In describing the seamer, reference will be made to the first and second grooved guide rollers 15 and 16 (the interlocking rollers) that aid in bringing and holding the replaited sheet in the proper position. They operate against the outer bend S5 of the replaited sheet and prevent it from falling away as the angled sheet is positioned in it. They hold the replaited sheet in position as its outstanding edge O is closed against the angled sheet A.

Figure 4:
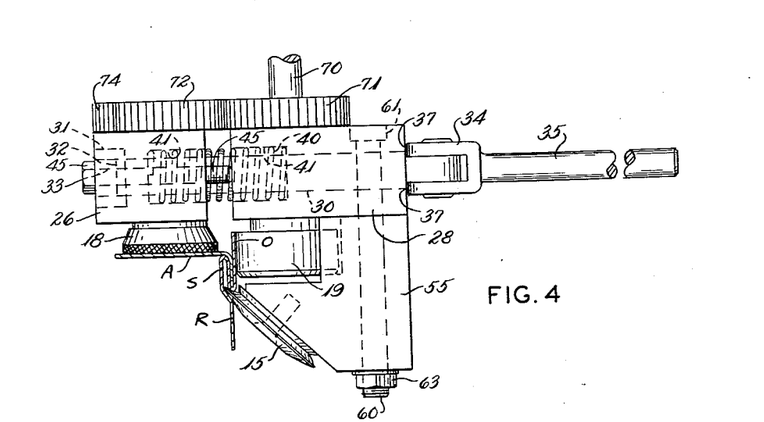
FIG. 4 is a front view of one type of the seamer with the edges of two sheets of metal in position between the two positioning rollers and one of the grooved guide rollers.
Figure 10:
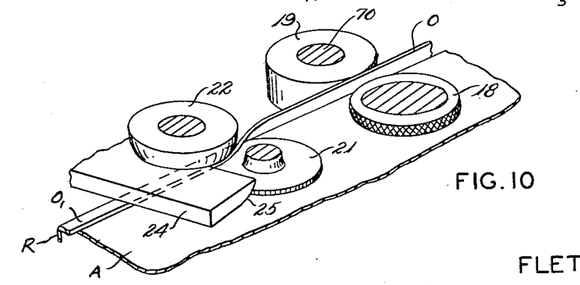
FIG. 10 is a view in perspective showing the positioning and folding rollers and the guide plate locking and angled sheet in a replaited sheet, according to the method as performed by the type of equipment illustrated in FIGS. 4–9.

The inner and outer positioning rollers 18 and 19 are clearly shown in FIGS. 4 and 10. The outstanding edge O is held tangent to the roller 19 as the replaited sheet R enters the seamer. Therefore, the cylindrical surface of this roller 19 extends below the bottom of the positioning roller 18. The angled sheet, inside of the bend, is forced flush against the bottom face of the roller 18 by the pressure of the grooved guide rollers 15 and 16 which is transmitted to the angled sheet through the replaited sheet. One or both of these positioning rollers may have a milled surface to facilitate the movement of the seamer along the lock as it is formed.

The inner and outer folding rollers 21 and 22 are clearly shown in FIG. 10. They are located to the rear of the seamer, so are not shown in FIG. 4 but are clearly shown in FIG. 7. The outer roller 22 has a bell-shaped surface. The inner folding roller 21 is a thin roller. The sheet metal members are pressed together by the guide rollers 15 and 16, with the surface of the angled sheet A flush against the exposed flat surface of the roller 18. The outstanding edge O of the replaited sheet is bent over the edge of the thin roller 21 by the bell-shaped surface of the folding roller 22 in closing the lock, as clearly shown in FIG. 10.

Figure 8:
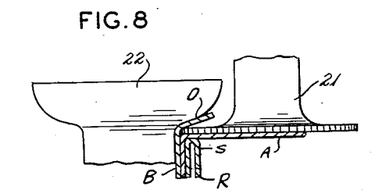
FIG. 8 is a detail showing the two folding rollers cooperating with a stationary guide plate in the process of completing the lock between the sheets of metal.

In order for the bell-shaped roller to function as described, the wall of the bell merges with its flat top in a rounded convex surface (FIG. 8), and this convex surface merges with the cylindrical wall of the roller in a concave curve (FIG. 8). The surface of the roller is a continuous smooth curve from the cylindrical portion to the wall of the bell.

Figures 5, 5A, 6:
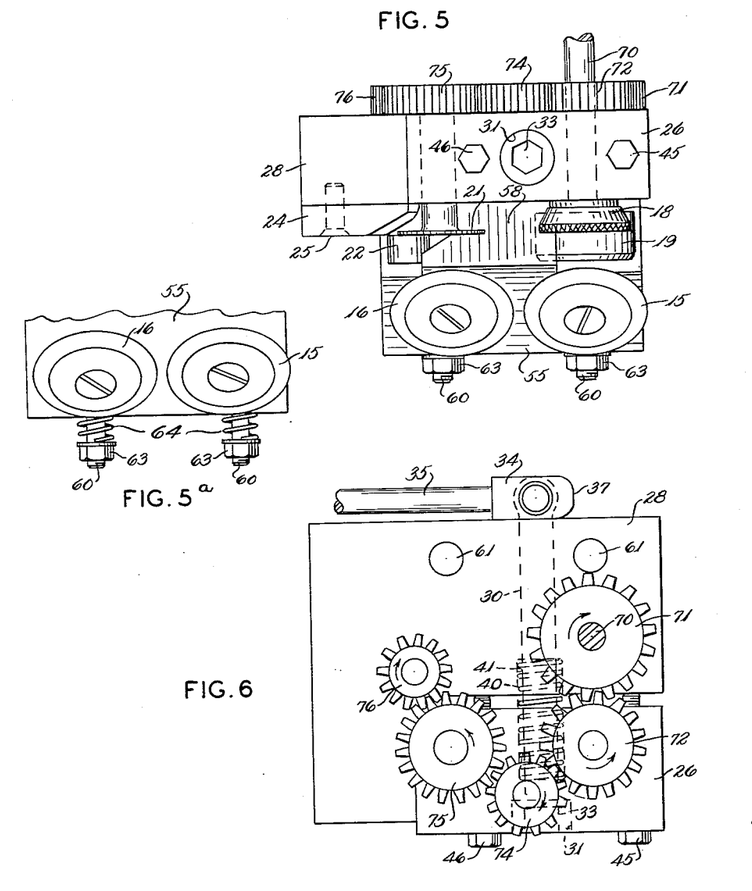
FIG. 5 is a view of the left side of the seamer, showing the grooved guide rollers, the positioning rollers and the folding rollers.
FIG. 5a is a detail showing a modified construction.
FIG. 6 is a top view of the seamer.

It is the pressure of the oncoming bell-shaped roller against the edge O that folds this edge over, the fold being guided and completed by the roller 21 and the forming plate 24. The forward edge of the outstanding edge O first contacts the smoothly rounded convex shoulder of the bell (FIG. 8). The thin edge of the roller 21 which is aligned with the edge of roller 18 presses against the inside surface of this outstanding edge so that the fold is started at a location spaced a short distance from the bend B of the angled sheet A. As the seamer moves beyond this point of first contact, the outstanding edge O is pressed by the bell of the roller 22 over the flat surface of the roller 21, as the roller 21 moves beyond it and out of contact with it. As the movement of the seamer continues, the edge O is progressively flattened by contact with the portions of the bell of the roller 22 which are progressively more nearly parallel with the exposed surface of the sheet A. This is illustrated in FIG. 5. During this period the cylindrical portion of the roller 22 moves tangentially of the portion of the sheet R below the outstanding edge O.

The undersurface 25 of the guide plate 24 tapers to a knife edge at its forward edge and is cut away at one end (FIG. 7) so as to conform closely to the shape of the adjacent portion of the roller 22. As the forward edge of the guide plate contacts the outstanding edge O the bell of the roller 22 moves out of contact with it, and it passes between the roller 21 and the under side of the forming plate 24, and becomes progressively more flattened by the greater pressure of the guide plate as its thin edge passes over it and it contacts the progressively thicker portion. As the rear of the guide plate moves out of contact with it (FIG. 10), it is flush against the surface of the angled sheet A. The forming plate 24 is of sufficient width to complete the lock on a seam radiused in either direction as well as on a straight seam.

The action of the bell-shaped roller in forming the seam is unique. The thin roller 21 makes substantially point contact with the outstanding edge O, and this point moves from one end thereof to the other. On the opposite side of the outstanding edge O, the first contact is with a portion of the bell quite remote from the cylindrical portion of the roller, and this is substantially opposite the point contact made by the roller 21. As the seamer moves along the lock the point of contact of the roller 22 with the metal becomes progressively nearer the cylindrical portion of the roller 22, and progressively nearer that portion of the surface of the outstanding edge O which is opposite the edge of the roller 22. The roller 21 moves out of contact with the metal before the metal makes contact with the forming plate 24 where the lock is completed.

In the seamer which is illustrated in FIGS. 4–10 of the drawings, the inner positioning and folding rollers 18 and 21 are preferably mounted on a separate base or block 26 which is movably attached to the main base or body 28 of the seamer. In the arrangement shown, a corner of the main body 28 is cut away, and the separate block 26 is slidably mounted in it. The rod 30 extends through the main body and the movable block and is held in a countersunk area 31 of the movable block 26 by the washer 32 and nut 33. The yoke 34 at the inner end of the handle 35 is pivoted to the other end of the rod 30. The curved bottom ends 37 of the yoke are eccentric so that when the handle is extended as in FIG. 4 the tension on the road 30 is slackened and the movable block 26 is away from the main body. This is the situation illustrated in FIG. 4.

Figure 7:
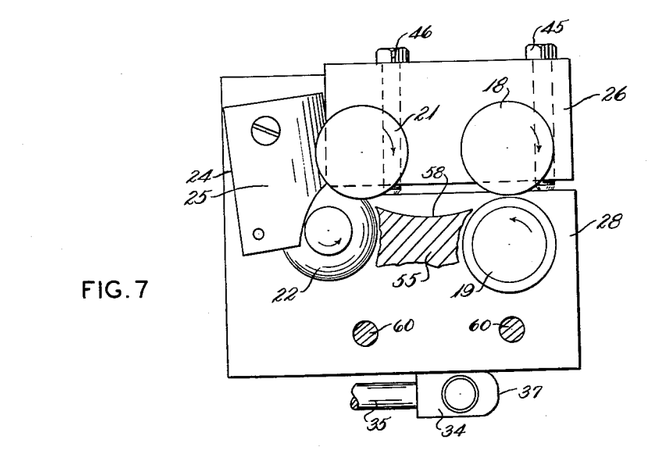
FIG. 7 is a bottom view of the seamer, with most of the angle block which holds the guide rollers removed.

The spring 40 in the recessed openings 41 (FIG. 4) tends to keep the block 26 separate from the main body 28 when the two are not drawn together by folding the handle 35 against the seamer, as illustrated in FIGS. 6 and 7.

Figure 4A:
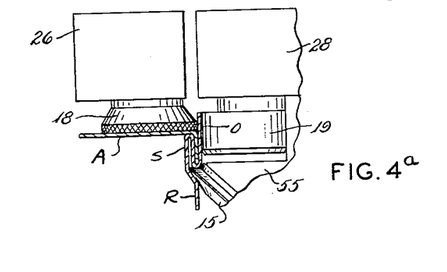
FIG. 4a is a view of the same but with the two positioning rollers brought together against opposite sides of the upstanding edge of the replaited sheet.

The two adjustment pins 45 and 46 are shown screwed in the block 26 with their inner ends abutting the surface of the main body 28. They limit the extent to which the block 26 can be drawn to the block 28 by movement of the handle 35. In other words, these adjustment pins 45 and 46 control the minimum opening between the two blocks and thus control the pinch of the rollers 18 and 19 against the outstanding edge O of the replaited sheet, when the movable block is drawn to the main body, as illustrated in FIG. 4a. The pins 45 and 46 are adjustable so that the minimum spacing between the movable block and the main body of the seamer can be adjusted to accommodate sheet metals of different gauge. The use of pins such as 45 and 46 is optional.

The two sheet-metal edges which are to be fastened together are first prefabricated in the usual way to produce an angled edge B in a sheet A, and a replaited sheet R with an outstanding edge O. The positioning rollers 18 and 19 move along these as illustrated in FIGS. 4 and 10. The first grooved roller 15 applies upward pressure to the bend S5 of the replaited sheet, and this presses the face of the angled sheet A against the bottom face of the roller 18, as illustrated in FIG. 4. Then by operation of the handle 35, the inside roller 18 is moved toward the outside roller 19 and the outstanding flange O of the replaited sheet is squeezed between them (FIG. 4a). One or preferably both of the positioning rollers are driven rollers.

The grooved guide rollers 15 and 16 are mounted on the block 55 (which may be made integral with the main body of the seamer) at an angle of substantially 45 degrees to the outstanding edge O of the replaited sheet. The upper corners of this block are cut away to accommodate the rollers 19 and 22. The edge 58 (which if straight would be tangential to the roller 18) faces the outstanding edge O as it passes through the seamer. It is preferably concaved out, as illustrated in FIGS. 5 and 7, in order that the seamer may be used in completing a lock along the edge of an angled sheet of metal. The seamer as shown can also be used on an angled sheet with an inside radius.

FIGURE 5 illustrates the angular block 55 held to the main block 28 by bolts 60 whose circular heads 61 (FIG. 6) are countersunk in the top of the main block. They are held by the nuts 63. Alternatively, stiff springs 64 (FIG. 5a) may be located between the nuts and the block 55 to provide a yielding pressure of the guide rollers 15 and 16 against the inner bend 54 of the Pittsburgh lock.

The axes of the rollers 18, 19, 21 and 22 are preferably parallel. It is possible to slant the axis of the bell-shaped roller 22 somewhat, and this will change the angle of the curve of its bell-shaped surface. However, in the simplest construction, the axes of all of these rollers are parallel.

The rollers 18, 19, 21 and 22 are preferably all driven from the drive shaft 70. The pinion 71 is keyed to this drive shaft. The pinion 72 meshes with the pinion 71. It is mounted on the slidable block 26, and when the slidable block is opened by movement of the handle 35 the pinions are separated somewhat but not so far as to throw these pinions out of mesh. The pinion 74 connects the pinion 72 with the pinion 75. The pinion 75, in turn, drives the pinion 76. Pinions 71 and 76 are connected by shafts with the rollers 18 and 21 which are mounted on the main body of the seamer. The pinions 72 and 75 are similarly connected by shafts to the rollers 19 and 22 which are mounted on the movable block 26. The rollers 18 and 21 are both driven in the same direction, being connected by the pinion 74, and the rollers 19 and 22 also rotate in the same direction but in the opposite direction from the rollers 18 and 21.

To complete a Pittsburgh lock, the two sheets of metal suitably fabricated are interlocked and the seamer is started along the outstanding edge of the replaited sheet, with the guide roller 15 bearing against the inner bend S5 at the fold of the replaited sheet and with the outstanding edge O flush against the roller 19. This is done with the slidable block 26 spaced from the main body of the seamer. The upper face of the angled sheet is against the bottom of the roller 18. The slidable block 26 is then moved toward the main block of the seamer by pressing the handle 35 against the seamer. This brings the roller 18 against the outstanding edge O and the rotation of the pinions and rollers moves the seamer along this edge, and the lock is progressively completed.

If the seamer is equipped with adjustment bolts 45 and 46, these are now turned to provide the desired minimum space between the block 26 and the main body of the seamer, while still allowing sufficient pressure of the rollers 18 and 19 against the outstanding edge O to cause the seamer to move forward and complete the lock.

Figure 9:
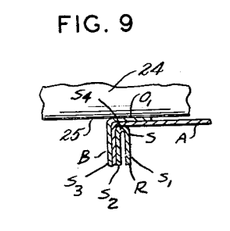
FIG. 9 is a section of the completed lock under the guide plate.

As the bell of the roller 22 presses against the forward edge of the outstanding edge O, this edge O is bent over the edge of the folding roller 21 (FIG. 8), and under the guide plate 24. The outstanding edge O is thus bent flush against the sheet A, as illustrated in FIG. 9, and the seam is completed. The seamer is designed to close a Pittsburgh lock of any length whatsoever. On completion of the lock, the seamer rides off the end of the closed lock, being driven by the continued rotation of the rollers. Then the handle 35 is moved to open the seamer for the reception of further sheets of metal which are to be seamed together.

In the type of equipment shown in FIGS. 11–20, an electric motor or other source of power is located in the housing 101. This is equipped with a handle 102 for convenient transportation and for handling during the operation of the seamer. The motor, if a motor be used, is provided with reducing gears located in a suitable compartment 103. The positioning roller 105 and folding roller 106 are driven rollers, which cooperate with the positioning roller 107 and the roller 108. All four of these rollers have a milled periphery, the periphery of the roller 106 being relatively narrow for a reason to be explained.

The rollers 105 and 106 are positioned on the main base 110, and the rollers 107 and 108 are positioned in a cut-away portion of the member 111 fastened to the underside of the movable base 112. The base 112 is movable toward and away from the base 110 as the jaws of a vise, so that the outstanding edge O of a sheet of metal can be clamped between them.

The jaws are brought together and separated by lowering and raising the handle 120. The clevis 121 at the base of the handle straddles the member 122 which is fastened to the screw 123 which extends through the openings 124 and 125 in the stationary base 110 and the movable base 112. The rounded corner 130 of the clevis which bears against the surface 131 of the movable base 112 serves as a cam. The spring 133 which surrounds the screw 123 is compressed between the shoulder 134 of the screw and the stationary base 110. Compression on the spring is varied by turning the head 135 of the internally threaded screw 136, to accommodate sheets of different thickness between the rollers 105, 106, 107 and 108. The screws 138 (FIG. 15) serve simply as guide pins to prevent the base 111 from turning about the screw 123.

The interlocking rollers 140 and 141 are held in a sliding carriage 142 which dovetails (see FIG. 19) in the under surface of the movable base 112. This surface makes an angle of about 45 degrees with the horizontal. The carriage 142 is slid in and out of the base 112 by lowering and raising the handle 120. This also moves the base 112 toward the stationary base 110, and separates it. The mechanism for doing this will now be explained.

There is a rack 155 on the dovetail of the carriage 142. This meshes with the pinion 156 which is permanently mounted in an opening in the movable base 112. This pinion is keyed to the arm 160 of the toggle 160—161, the end 161 of the toggle being pivoted at 162 in the clevis 121. Thus, as the handle 120 is moved up and down the pinion 156 is moved first in a counterclockwise and then in a clockwise direction, and this slides the carriage 142 first away from, and then toward the bend S5 of the fold S.

Figures 11, 16:
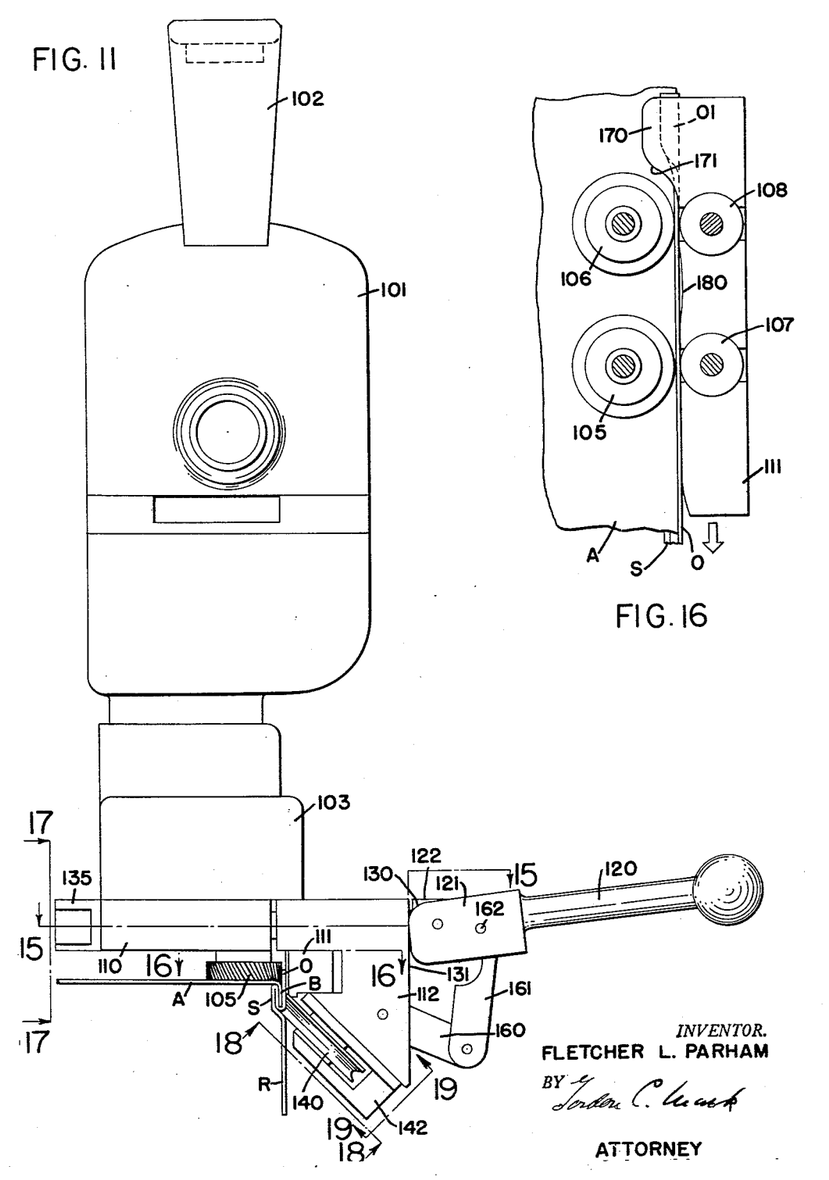
FIG. 11 is a front elevation of the second type of seamer.
FIG. 16 is a plan view of the gripping rollers and forming means of this type of seamer on the line 16—16 of FIGS. 11 and 12.
Figure 12:
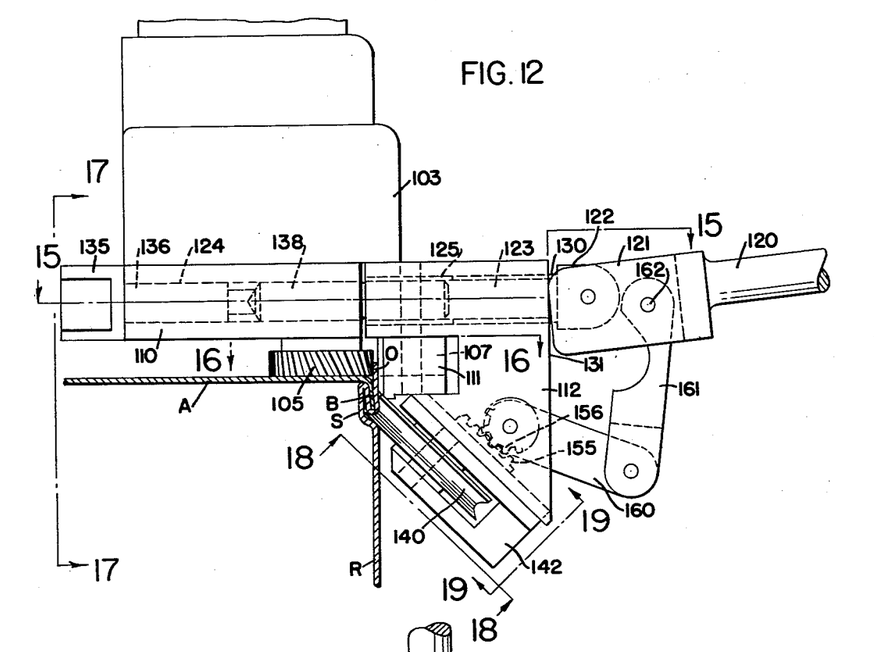
FIG. 12 is a fragmentary view of the bottom of the seamer shown in FIGURE 11, on an enlarged scale.
Figure 13:
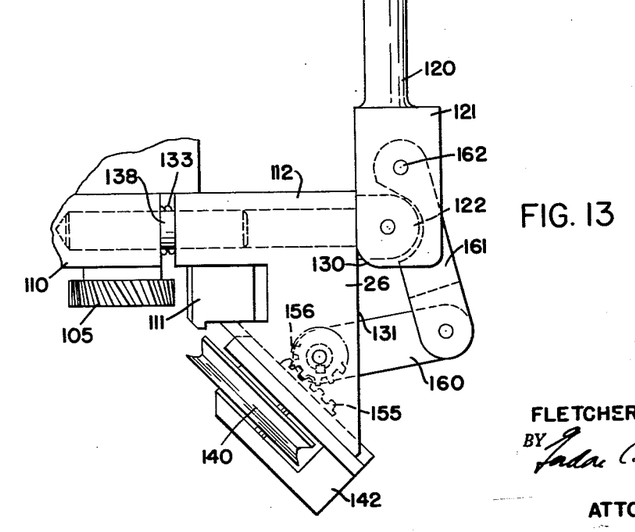
FIGS. 13 and 14 are similar views, showing the grooved interlocking rollers in different positions.
Figure 14:
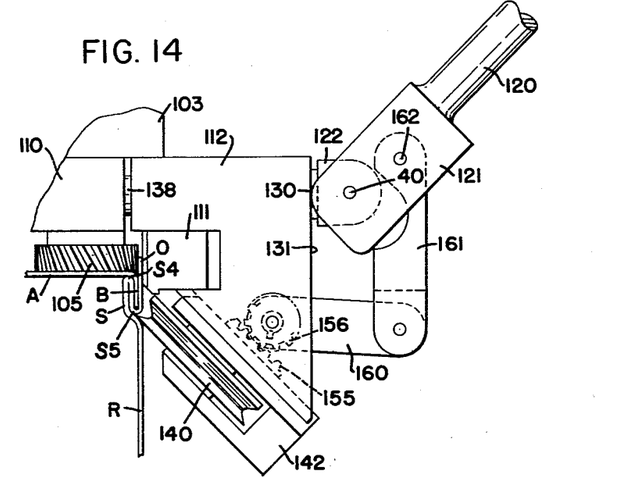
Figure 15:
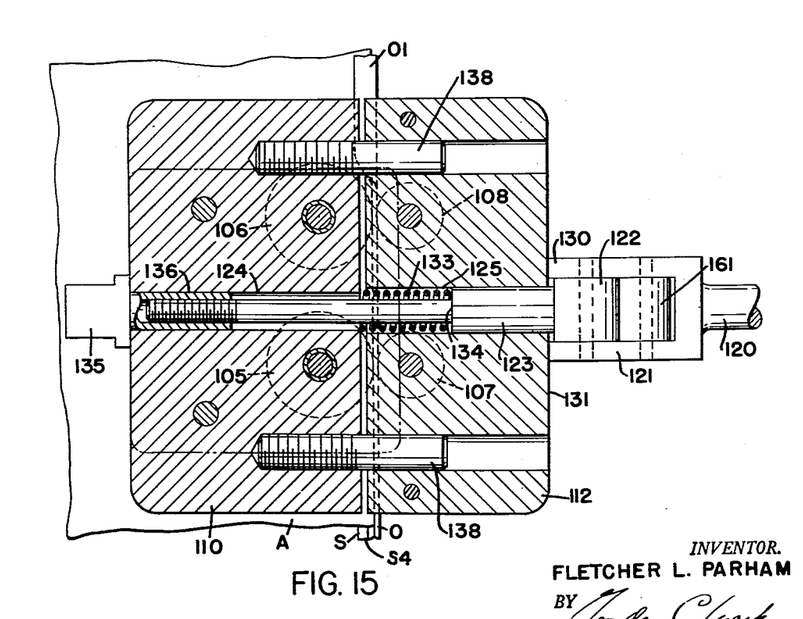
FIG. 15 is a horizontal section on the line 15—15 of FIGS. 11 and 12.
Figure 17:
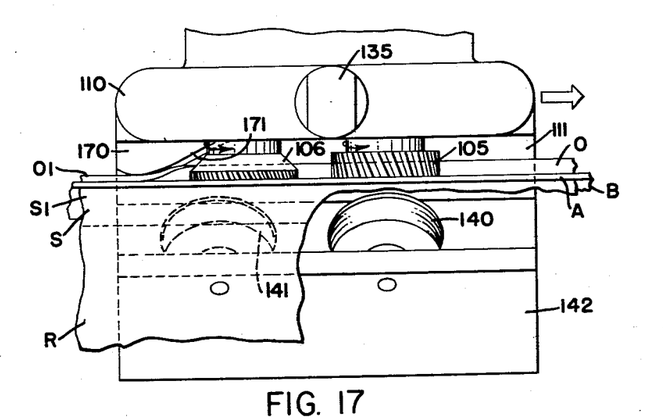
FIG. 17 is a side view on the line 17—17 of FIGS. 11 and 12, with a part of the replaited sheet broken away to show one of the positioning rollers in full lines, the other being shown in dotted lines.
Figure 18:
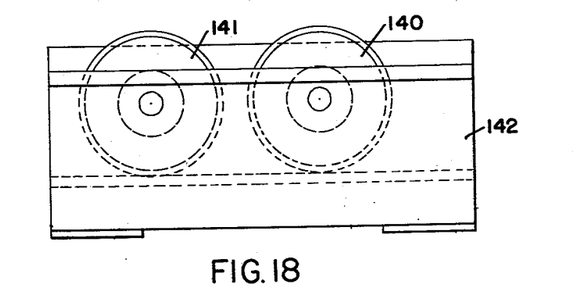
FIG. 18 is a bottom view of the positioning rollers and supporting equipment on the line 18—18 of FIGS. 11 and 12.
Figure 19:
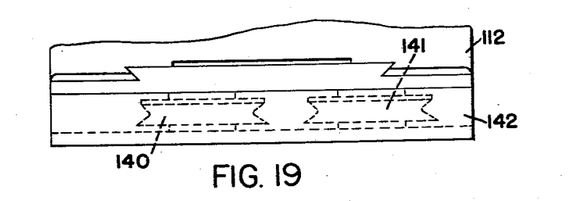
FIG. 19 is an end view of the same, on the line 19—19 of FIGS. 11 and 12.

FIGURES 11 to 14 show the effect of changes in position of the handle and toggle on both the relative positions of the base members 110 and 112, and the relative positions of the carriage 142 and the S-fold S. When the handle is raised (FIG. 13) the bases 110 and 112 are separated, and the carriage 142 is away from the S-fold. When the handle is horizontal (FIGS. 11 and 12), the bases 110 and 112 are close together, and the carriage is moved toward the S-fold so that rollers 140 and 141 press it up, in place. With the handle in the intermediate position (FIG. 14) the bases are close together, but the carriage is away from the S-fold. Therefore, in putting the seamer into operation, the handle is first raised (FIG. 13). The head 135 of the screw 136 is turned to adjust the seamer to accept sheet metal of the proper gauge. The seamer is brought into operating position on two prefabricated metal sheets with the edge B of the angled sheet A engaged in the S-fold of the replaited sheet R. With the seamer properly positioned over the edge O, the handle is depressed. Although it will ordinarily be lowered to the horizontal in a single operation, the intermediate position of the parts is illustrated in FIG. 14. As shown in this figure, the movable base 112 has been pressed toward the stationary base, against the action of the spring 133, by the action of the cam 130 against the end of the movable base. Although the toggle 160–161 has moved the carriage 142 and rollers 140 and 141 toward the S-fold, the rollers have not been brought into supporting contact with it. This is brought about only by bringing the handle to the horizontal position (FIGS. 11 and 12).

After the handle has been brought to the horizontal position the motor is started. The rotation of the rollers 105 and 106, causes the seamer to travel along the lock in the direction of the arrow in FIGS. 16, 17 and 20. The shoe 170 turns the outstanding edge O over, as this edge is forced progressively under the shoe. The forward surface 171 of the shoe is smoothly curved to bring this about.

The portion of the roller 106 of large diameter, which has the milled edge 173 (FIG. 20) is shallow so as not to interfere with the action of the shoe in bending the edge O flat against the sheet A.

Although designed primarily for interlocking a sheet A with a straight edge, in a replaited sheet, this edge need not be perfectly straight. The member 111 is somewhat concaved at 180, between the rollers 107 and 108 to accommodate a sheet A with a curved edge.

FIGURES 21 to 27 illustrate a third type of seamer, designed more particularly for handling heavier gauge sheet metal. The seamer is of heavier construction and may be permanently mounted.

In this type of equipment, the outstanding edge O is guided between two pairs of rollers 205, 206, 207 and 208 of much the same construction as the rollers 105, 106, 107 and 108 of the prior design. Although shown as somewhat different, they might be identical. All four of these rollers are positioning rollers. They do not aid in flattening the edge O. Instead of a shoe to turn down the outstanding edge O, this is done by the pressure of a bell-shaped roller 210. This roller is pressed against the edge O by the spring 212. The pressure of the spring 212 can be kept uniform for metals of different gauges, or can be changed as desired, by turning the adjusting nut 213.

Figures 23, 23A, 24:
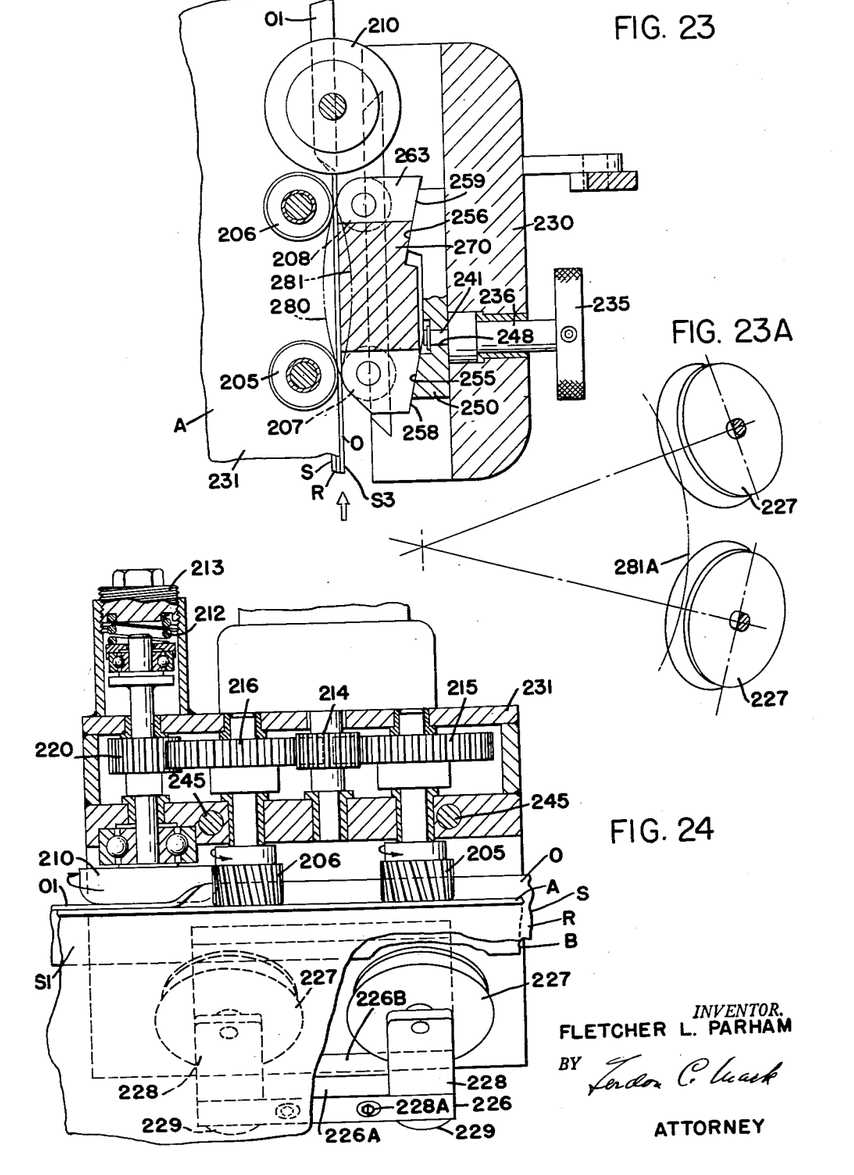

The drive gear 214 (FIG. 24) drives the pinions 215 and 216 which turn the rollers 205 and 206, and the pinion 220 turns the roller 210 in the reverse direction, as indicated by the arrows in FIGS. 24 and 27.

The handle 225 (through the toggle, a pinion and rack) positions the carriage 226 and interlocking rollers 227, just as in the type of seamer previously described.

If the seamer is permanently mounted, the locked sheets will travel through it in the direction of the arrow in FIG. 27, instead of the seamer traveling in the opposite direction. Thus, the edge O is progressively moved under the bell of the roller 210 and flattened against the sheet A.

Each interlocking roller 227 is rotatably supported in its own clevis 228. The carriage 226 is formed in two parts 226A and 226B, held together by screws 228A. Each clevis is supported on a shaft with an end portion 229 of larger diameter. The portions of smaller diameter are revolvably held between the two halves of the carriage. When the sheet A has a straight edge, as in FIG. 24, the rollers are in alignment.

In this type, the movable base 230 is not moved toward and away from the stationary base 231 by the movement of the handle 225. They are separated for reception of the edge O of the sheet metal by turning the knob 235 on the adjusting shaft 236 in one direction, and moved into gripping relation with thhe edge O by turning the knob in the reverse direction. Springs 238 in recesses in the base 230 tend to spread the bases 230 and 231. The heads 242 of the internally threaded screws 243 are turned down on the stationary screws 245 to regulate the spread of the bases for sheets of different thicknesses.

The eccentric pin 241 (FIGS. 21, 23, 25 and 26) on the inner end of the shaft 236 moves from one end to the other of the opening 248 in the cam 250 as the knob 235 is turned. This movement of the pin, moves the cam toward one end or the other of the base 230. The two extreme positions are illustrated in FIGS. 25 and 26. The cam surfaces 255 and 256 (FIG. 23) bear against the surfaces 258 and 259 of the support 263 for the rollers 207 and 208. This support dovetails at 270 (FIGS. 25 and 26) in the bottom of the base 230.

To operate a permanent installation of this type of equipment, the handle 225 is raised to move rollers 227 away from the location of the S-fold of the material to be operated upon. The spread between the bases is adjusted for sheets of proper gauge by adjustment of the screws 243. Then the edge B of the angled sheet is inserted in the S-fold of the replaited sheet, and one end of the outstanding edge O is placed between the rollers 205 and 206 on one side, and rollers 207 and 208 on the other side. Then the handle is lowered to bring the interlocking rollers 227 into contact with the S-fold, and the knob 235 is turned to squeeze the edge O of the replaited sheet between thhe two sets of rollers. The motor is then turned on and the sheets are fed through the seamer by these rollers, in the direction of the arrow in FIG. 23. The edges of the permanent base 231 and support 263 are rounded out at 280 and 281, to accommodate angled sheets A with rounded (circular, oval, etc.) edges. As the edge O contacts the bell-shaped roller, it is progressively flattened against the angled sheet A, to complete the lock.

The clevis 228 in which each interlocking roller 227 is supported, swivels easily in the carriage 226, so that the angular relation of the rollers to each other readily conforms to the shape of the edge of sheet A. If the edge of the sheet is the arc of a circle, conforming to the curved edge 281 of the movable base 230, these rollers 227 will assume the position indicated in FIG. 23A where they have swivelled in the carriage 226 so that their grooved circumferences will accept, and exert an upward pressure, on the fold S of sheet R pressed upwardly over the edge B of a sheet A having a circular edge of the same radius as the edge 281 (FIG. 23), and represented by the arc 281A of FIG. 23A.

The equipment shown and described is illustrative. All four of the positioning and forming rollers may be driven. Only two such rollers may be used, and in that event they will be used for positioning the two sheets as they approach the forming mechanism. There may be but a single interlocking roller. More than two such rollers may be used, but very satisfactory results have been obtained with only two. Modifications may be made in the forming means utilized for bending the outstanding edge O flat against the sheet A. The pressure is effected by a stationary cam, although the surface of the cam may be rotating.

It is preferable to include means for spacing the rollers to operate on stock of different gauges. For 16-gauge stock there should be a distance of about ⅝ inch between the radius of the grooved interlocking rolls and the bottom surface of the driven positioning roll against which the sheet A is placed. For 28-gauge stock this distance should be about ⅜ inch. Generally it will be found difficult to provide adjustments covering this range in a single seamer, and seamers of two different sizes designed particularly for operating on stocks of these two different gauges will provide sufficient leeway for the treatment of stocks of intermediate gauge in either one of the seamers or the other.

Recognizing that modifications are possible in the seamers illustrated and described, the invention is covered in the claims which follow.

What I claim is:

1. The process of closing a Pittsburgh lock from the assembly of an angled sheet-metal member and a replaited sheet-metal member with an S-fold therein, which replaited member has an outstanding edge extending from the S-fold in substantially the same plane as the plane of the replaited member inside of the S-fold, using propelling, pressure-applying means, which process comprises applying pressure by said means to opposite sides of the outstanding edge progressively from one end thereof to the other and thereby moving the means therealong, and at the same time as a continuous operation directly and in one step folding the outstanding edge of said replaited member by continuous pressure from said means against the outside portion of the outstanding edge progressively from one end thereof to the other whereby the outstanding edge is folded flat against the angled member inside of the bend thereof, and maintaining said means in pressure contact with said edge until it is folded flat against the angled member and the closing of the lock is completed.

2. The process of closing a Pittsburgh lock from the assembly of an angled sheet-metal member and a replaited member with an S-fold therein, which replaited member has an outstanding edge extending from the S-fold in substantially the same plane as the plane of the replaited member inside of the S-fold, using propelling, pressure-applying means with a revolving surface, which process comprises applying pressure by said means to opposite sides of the outstanding edge progresively from one end thereof to the other and thereby moving the means therealong, and at the same time continuously contacting a trailing area of the outside surface of the outstanding edge of the replaited member with the revolving surface and during said contact continually moving the area of contact with the revolving surface from a position substantially parallel to the outside edge and adjacent thereto, to a position perpendicular thereto and thereby bending the outside edge to a position adjacent the angled member inside the angle and completing the closing of the lock.

3. The process of closing a Pittsburgh lock from the assembly of an angled sheet-metal member and a replaited sheet-metal member having an S-fold therein, which replaited member has an outstanding edge extending from the S-fold in substantially the same plane as the plane of the replaited member inside of the S-fold, using propelling, pressure-applying means, which process comprises applying pressure by said means to opposite sides of the outstanding edge progressively from one end thereof to the other and thereby moving the means therealong, and at the same time continuously applying pressure to a trailing area of the outside surface of the outstanding edge by continuous and substantially line contact of said means therewith and thereby folding the outstanding edge progressively in a single folding operation against the angled member inside the bend thereof and completing the closing of the lock.

4. The process of claim 3 in which the outstanding edge is progressively bent into contact with the angled member while pressing the angled member and replaited member together by applying pressure (1) directly to the outer bend of said S-fold in the direction of the angled member at an angle of about 45° to the original plane of the outstanding edge and (2) to the outside surface of the angled member inside the bend thereof, to hold them in interlocking relation.

5. In the process of closing a Pittsburgh lock from the assembly of an angled sheet-metal member and a replaited sheet-metal member with an S-fold therein in which is an outer bend, with an outstanding edge extending beyond the S-fold in substantially the same plane as the replaited member inside of the S-fold, with the bent edge of the angled member in the S-fold, the step of pressing said members to hold them in said relation by applying pressure continuously and progressively (1) to the outside surface of the angled member inside of the bend and (2) directly to the outer bend of said fold in the direction of the angled member at about 45° to the original plane of the outstanding edge and completing the closing of the lock.

6. The process of closing a Pittsburgh lock from the assembly of an angled sheet-metal member and a replaited sheet-metal member having an S-fold therein in which is an outer bend, with an outstanding edge extending beyond the S-fold in substantially the same plane as the replaited member inside of the S-fold, which process comprises manually fitting the bend of the angled member in said fold and then while maintaining the members in said relation by applying pressure continuously and progressively (1) to the angled member inside of the bend and (2) directly to the outer bend of the fold in the direction of the angled member at about 45° to the original plane of the outstanding edge, completing the closing of the lock.

7. The process of closing a Pittsburgh lock which comprises fitting the bent edge of an angled sheet-metal member into an S-fold of a replaited member, which replaited member has an outstanding edge extending from the S-fold in substantially the same plane as the plane of the replaited member inside of the S-fold, holding said members in interlocked relation simultaneously and progressively and then folding the outside edge of the replaited member against the outside surface of the angled member inside of the bend by applying pressure (1) to the outside surface of the angled member inside of the bend and (2) directly to the outer bend of said fold in the direction of the angled member at about 45° to the original plane of the outstanding edge, and then progressively folding the outstanding edge of the replaited member against the outside surface of the angled member inside of the bend and thereby completing the closing of the lock.

8. The process of closing a Pittsburgh lock between an angled sheet-metal member and a replaited sheet-metal member having an S-fold therein, which latter member has an outstanding edge, which process comprises moving folding means along the outstanding edge of the replaited member by applying pressure by propelling means to opposite sides of said outstanding edge progressively from one end thereof to the other end, and at the same time by said folding means progressively folding to the outside of the angled member inside of the bend, a portion of the outstanding edge adjacent the portion with which contact is made in said moving operation.

9. A seamer for closing a Pittsburgh lock between an angled sheet-metal member and a replaited sheet-metal member having an S-fold therein with an opening between the outer bend and the inner ply thereof, which seamer comprises a frame positioning rollers thereon to apply pressure to opposite surfaces of the outstanding edge of the replaited member and an interlocking roller with a flanged circumference adapted to enter said opening with an area of the roller adjacent the flange thereof to apply pressure to the outer bend of the S-fold, the axis of said interlocking roller being at an angle of substantially 45° to the plane of said outstanding edge when held between the positioning rollers; the positioning rollers and the interlocking members being mounted on the frame.

10. The seamer of claim 9 which is portable and adapted to be moved along said outstanding edge by contact of the positioning rollers with said opposite surfaces thereof, and means for rotating said positioning rollers.

11. The seamer of claim 9 in which there is forming means in the path of said outstanding edge adapted to fold the same in one continuous forming operation against the outside surface of the angled sheet-metal member.

12. The seamer of claim 9 in which the interlocking roller is angularly movable with respect to said plane.

13. The seamer of claim 9 in which the interlocking roller is supported in means movable toward and away from said outside bend of the fold.

14. A seamer for closing a Pittsburgh lock between an angled sheet-metal member and a replaited sheet-metal member, which seamer comprises a frame, positioning rollers adapted to rotate against opposite surfaces of the outstanding edge of the replaited member, forming means in the path of said outstanding edge and adapted to fold the same in one continuous forming operation against the outside surface of the angled sheet inside of the bend and at least one interlocking roller angled away from the replaited member and from both the positioning rollers and forming means, and adapted to contact the outside bend of said fold in the replaited member; the positioning rollers, the forming means and the interlocking roller all being mounted on the frame.

15. A seamer for forming a Pittsburgh lock between an angled sheet-metal member and a replaited sheet-metal member with an S-fold therein and a narrow opening between the inner ply and the outer bend thereof, said replaited member having an outstanding edge, which seamer comprises a two-part frame with means for moving the parts toward and away from one another, the parts being in operating relation when so moved toward one another, means on one part positioned to apply pressure to the outside surface of the angled member inside of the bend thereof when the two members are interengaged, on the other part means with a flange to fit into said opening, also on said other part adjacent said flange means to apply pressure to the outer bend of the S-fold in the replaited member when the two members are interengaged and the parts are in operating position, and propelling means attached to said frame so that when said parts are in operating relation said propelling means are positioned to engage opposite sides of said outstanding edge for moving the seamer therealong relative to the sheet-metal members.

References Cited in the file of this patent
UNITED STATES PATENTS

| | | |
|---|---|---|
| 119,123 | Cohen et al. | Sept. 19, 1871 |
| 2,637,292 | George | May 5, 1953 |
| 2,655,120 | Neimann | Oct. 13, 1953 |
| 2,682,850 | Close | July 6, 1954 |
| 2,725,000 | O'Neil | Nov. 29, 1955 |

UNITED STATES PATENT OFFICE

CERTIFICATE OF CORRECTION

Patent No. 3,015,293 January 2, 1962

Fletcher L. Parham

It is hereby certified that error appears in the above numbered patent requiring correction and that the said Letters Patent should read as corrected below.

Column 2, line 40, for "and", third occurrence, read -- an --; column 4, line 61, for "road" read -- rod --; column 8, lines 20 and 47, for "thhe", each occurrence, read -- the --; column 11, line 3, after "frame" insert a comma.

Signed and sealed this 1st day of May 1962.

(SEAL)
Attest:

ERNEST W. SWIDER
Attesting Officer

DAVID L. LADD
Commissioner of Patents